US010531236B2

(12) United States Patent
Ayyagari et al.

(10) Patent No.: US 10,531,236 B2
(45) Date of Patent: Jan. 7, 2020

(54) UNIVERSAL MUTE FOR INTERNET OF THINGS ENABLED DEVICES

(71) Applicant: INTERNATIONAL BUSINESS MACHINES CORPORATION, Armonk, NY (US)

(72) Inventors: Phani Kumar V. Ayyagari, Hyderabad (IN); Manish A. Bhide, Hyderabad (IN); Madan K. Chukka, Hyderabad (IN); Purna Chandra R. Jasti, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 331 days.

(21) Appl. No.: 15/342,729

(22) Filed: Nov. 3, 2016

(65) Prior Publication Data

US 2018/0120821 A1    May 3, 2018

(51) Int. Cl.
*G05B 19/4155* (2006.01)
*H04W 4/02* (2018.01)
*H04W 4/16* (2009.01)
*H04W 4/029* (2018.01)

(52) U.S. Cl.
CPC ............ *H04W 4/029* (2018.02); *H04W 4/02* (2013.01); *H04W 4/16* (2013.01)

(58) Field of Classification Search
CPC ................................. H04W 4/02; H04W 4/16
See application file for complete search history.

(56) References Cited

U.S. PATENT DOCUMENTS

| 6,526,335 | B1* | 2/2003 | Treyz | G01C 21/26 307/10.1 |
|---|---|---|---|---|
| 7,620,166 | B2 | 11/2009 | Cadiz et al. | |
| 9,214,914 | B2 | 12/2015 | Tsukada | |
| 9,955,318 | B1* | 4/2018 | Scheper | H04W 4/043 |
| 2015/0029880 | A1* | 1/2015 | Burns | H04W 4/70 370/252 |
| 2015/0339917 | A1* | 11/2015 | Messing | H04W 4/70 340/12.5 |
| 2015/0358777 | A1* | 12/2015 | Gupta | H04L 12/2807 370/254 |
| 2016/0128158 | A1* | 5/2016 | Harder | H05B 33/0872 315/158 |
| 2016/0344592 | A1* | 11/2016 | Cook | H04L 41/12 |
| 2017/0020356 | A1* | 1/2017 | Zhang | A47L 9/0081 |
| 2017/0045261 | A1* | 2/2017 | Kim | F25B 49/022 |

(Continued)

FOREIGN PATENT DOCUMENTS

CN        105223818 A        1/2016

*Primary Examiner* — Moazzam Hossain
(74) *Attorney, Agent, or Firm* — Cantor Colburn LLP; Reza Sarbakhsh (57) ABSTRACT

The present application describes embodiments for reducing noise emanated by a device. An example computer implemented method includes receiving, by a supervisor device of a wireless system, a notification that an activity is being initiated. The method further includes, reducing the noise emanated by the device in response by determining, by the supervisor device a location of the device; in response to the location of the device being is within a predetermined vicinity of a location of the activity, sending, by the supervisor device a mute signal to the device.

20 Claims, 4 Drawing Sheets

(56) References Cited

U.S. PATENT DOCUMENTS

2018/0005160 A1\* 1/2018 Johnson, III ......... A61B 5/4266
2018/0095439 A1\* 4/2018 Karbasian .......... G05B 19/0426
2018/0096309 A1\* 4/2018 Moses ..................... H04L 67/12

\* cited by examiner

UNIVERSAL MUTE FOR INTERNET OF THINGS ENABLED DEVICES

BACKGROUND

The present application generally relates to electronic devices that are connected to a network, and more specifically, to controlling a state of the electronic devices.

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

SUMMARY

According to one or more embodiments, a computer implemented method for reducing noise emanated by a device includes receiving, by a supervisor device of a wireless system, a notification that an activity is being initiated. The method further includes, reducing the noise emanated by the device in response by determining, by the supervisor device a location of the device; in response to the location of the device being is within a predetermined vicinity of a location of the activity, sending, by the supervisor device a mute signal to the device.

According to one or more embodiments, a system for reducing surrounding noise includes a supervisor device of a local area network. The supervisor device receives a notification indicative of initiation of an activity by a first device in a local area network. The supervisor device further reduces noise emanated by a second device in the local area network in response by determining a location of the device, and in response to the location of the device being within a predetermined vicinity of a location of the activity, sending a mute signal to the device.

According to one or more embodiments, a computer program product for reducing surrounding noise emanated by one or more devices connected via a local area network (LAN) includes a computer readable storage medium. The computer readable storage medium includes computer executable instructions for performing a method. The method includes receiving, by a supervisor device of the LAN, a notification that an activity is being initiated, and in response, reducing, by the supervisor device, the noise emanated by the device. The computer program product also includes determining, by the supervisor device a location of the device, and in response to the location of the device being is within a predetermined vicinity of a location of the activity, sending, by the supervisor device a mute signal to the device.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Described herein are technical solutions for automatically reducing noise emanated by surrounding IoT devices when a user initiates an activity that is sensitive to external sounds. Accordingly, the technical solutions facilitate an automatic intelligent mute for IOT enabled devices based on characteristics of a device on which the user initiates the activity. Thus, the technical solutions avoid the user to have to identify, and consequently mute or pause surrounding devices that can distract the activity.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

Figure 1:
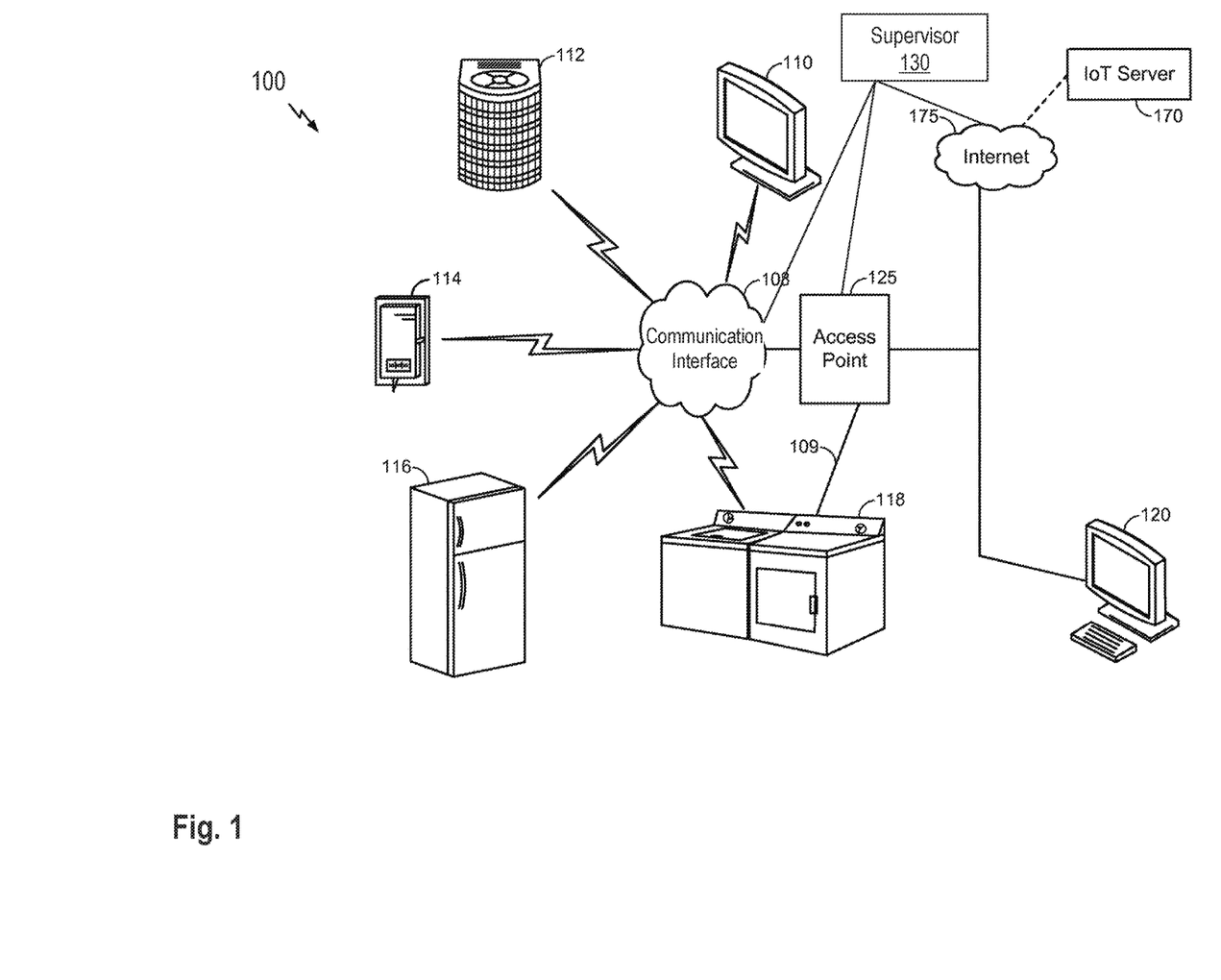
FIG. 1 illustrates a high-level system architecture of a wireless communications system in accordance with one or more embodiments.

FIG. 1 illustrates a high-level system architecture of a wireless communications system 100. The wireless communications system 100 may be a network, such as a local area network (LAN), or the Internet. The wireless communications system 100 contains multiple IoT devices, such as a television 110, an outdoor air conditioning unit 112, a thermostat 114, a refrigerator 116, and a washer and dryer 118. The IoT devices 110-120 communicate with an access network via an access point 125 over a physical communications interface or layer, shown as communication interface 108 and a direct wired connection 109. The communication interface 108 may comply with a wireless Internet protocol (IP), such as IEEE 802.11. Although FIG. 1 illustrates the IoT devices 110-120 communicating over the air interface 108 and the IoT device 118 communicating over the wired connection 109, each IoT device may communicate over a wired or wireless connection, or both.

The Internet 175 includes a number of routing agents and processing agents (not shown in FIG. 1). The Internet 175 is a global system of interconnected computers and computer networks that use a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

The computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over communication interface 108 or another wireless interface, and access the Internet 175 over the communication interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-120.

The access point 125 may be connected to the Internet 175 via an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

The IoT server 170 is shown as connected to the Internet 175. The IoT server 170 can be implemented as a plurality of structurally separate servers, or alternatively may correspond to a single server. In one or more examples, the IoT server 170 may be absent (as indicated by the dotted line), and the group of IoT devices 110-120 may be a peer-to-peer (P2P) network. In such a case, the IoT devices 110-120 can communicate with each other directly over the communication interface 108 and/or the wired connection 109. Alternatively, or additionally, some or all of the IoT devices 110-120 may communicate via another communication interface that is independent of the communication interface 108 and wired connection 109. For example, if the communication interface 108 corresponds to a Wi-Fi interface, certain of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

The wireless communications system 100 may further include a supervisor device 130, which may alternatively be referred to as an IoT manager 130 or IoT manager device 130. As such, the term "supervisor device" 130, may be interchangeably used with the terms IoT manager, group owner, or similar terminology that refers to the supervisor device 130 or another physical or logical component that provides the same or substantially similar functionality.

In one or more examples, the supervisor device 130 may monitor, control, or otherwise manage the other components in the wireless communications system 100. The supervisor device 130 may communicate with the access point 125 via the communication interface 108 and/or the direct wired connection 109 to monitor or manage attributes, activities, or other states associated with the IoT devices 110-120 in the wireless communications system 100B. The supervisor device 130 may have a wired or wireless connection to the Internet 175 and optionally to the IoT server 170. The supervisor device 130 may obtain information from the Internet 175 and/or the IoT server 170 that may further facilitate monitoring and/or managing attributes, activities, or other states associated with the IoT devices 110-120.

In one or more examples, the supervisor device 130 may be a standalone device or one of the IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100.

In one or more examples, each of the IoT devices 110-120 can treat the supervisor device 130 as a peer and transmit attribute/schema updates to the supervisor device 130. When a first IoT device needs to communicate with a second IoT device, the first IoT device requests a pointer or identifier for the second IoT device from the supervisor device 130 and then communicate with the second IoT device as a peer. The IoT devices 110-120 may communicate with each other over a peer-to-peer communication network using a common messaging protocol (CMP). As long as two IoT devices are CMP-enabled and connected over a common communication transport, they can communicate with each other.

Figure 2:
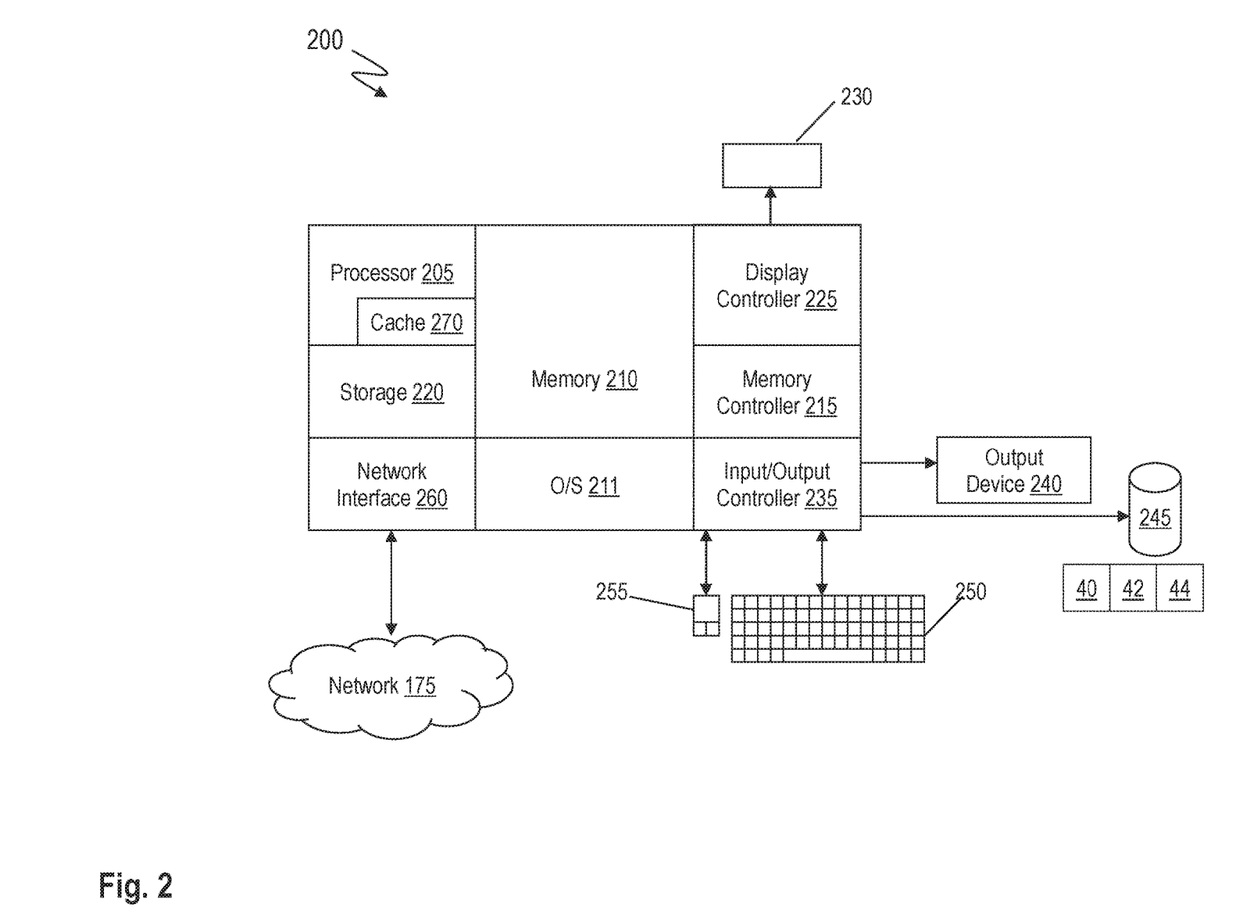
FIG. 2 illustrates an example IoT device in accordance with one or more embodiments.

FIG. 2 illustrates an example IoT device 200. The IoT device 200 may represent any of the IoT devices 110-120, the access point 125, and/or the supervisor device 130. Each of the devices 110-120, 125, and 130 may include components, such as those for their specific function, in addition to those illustrated in FIG. 2. The components illustrated in FIG. 2 include hardware, such as electronic circuitry.

The IoT device 200 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors (altimeter 40, accelerometer 42, GPS 44), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the IoT device 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The IoT device 200 may further include a display controller 225 coupled to a user interface or display 230. In some embodiments, the display 230 may be an LCD screen. In other embodiments, the display 230 may include a plurality of LED status lights. In some embodiments, the IoT device 200 may further include a network interface 260 for coupling to a network 175. The network 175 may be an IP-based network for communication between the IoT device 200 and an external server, client and the like via a broadband connection. In an embodiment, the network 175 may be a satellite network. The network 175 transmits and receives data between the IoT device 200 and external systems. In some embodiments, the network 175 may be a managed IP network administered by a service provider. The network 175 may be implemented in a wireless fashion, for example, using wireless protocols and technologies, such as WiFi, WiMax, satellite, or any other. The network 175 may also be a packet-switched network such as a local area network, wide area network, metropolitan area network, the Internet, or other similar type of network environment. The network 175 may be a fixed wireless network, a wireless local area network (LAN), a wireless wide area network (WAN) a personal area network (PAN), a virtual private network (VPN), intranet or other suitable network system and may include equipment for receiving and transmitting signals.

Figure 3:
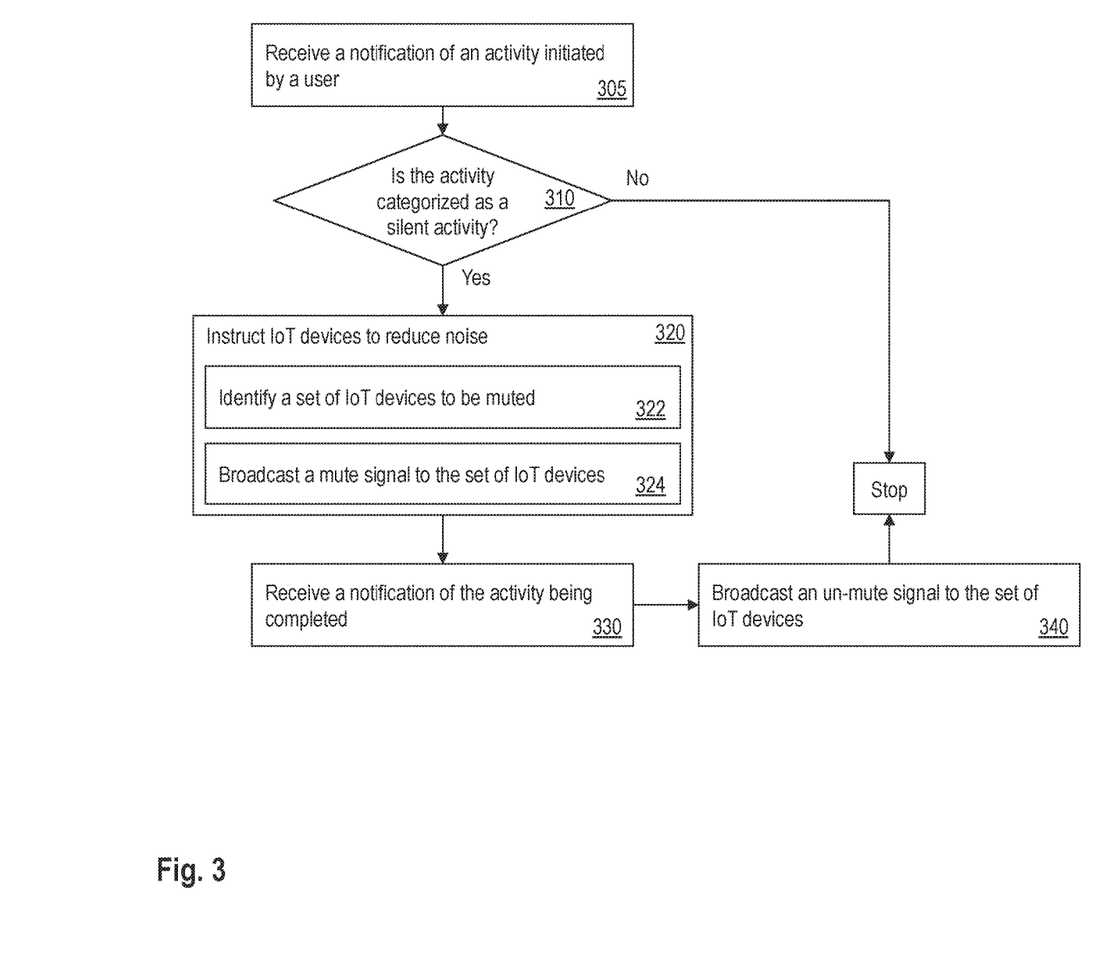
FIG. 3 illustrates a flowchart of an example that facilitates reducing noise emanated by IoT devices in a wireless system in accordance with one or more embodiments.

FIG. 3 illustrates a flowchart of an example that facilitates reducing noise emanated by the IoT devices 110-120 in the system 100 in response to the user initiating an activity in a predetermined vicinity of the system 100.

For example, the devices 110-120 may be devices in the user's home. The noise emanated by a device 200 includes not only audio playback, but also mechanical sound caused during functioning of the device 200. For example, if the device 200 is a TV or a music system, the noise emanated by the device 200 includes the audio being played by the device 200. Alternatively, in case the device 200 is a washing machine, a dishwasher, or an air-conditioning unit, the noise emanated by the device 200 includes the mechanical noise caused by the operation of the device 200.

The noise emanated by the device 200 may distract the user from an activity that the user may have initiated, such as a phone call, a meeting, or any other activity that has been categorized as a 'silent activity'. In one or more examples, the user may initiate the silent activity using another IoT device in the system 100. Alternatively, the user may initiate the activity using any other device, or without any device; however, the device 200 may know that the user has initiated the silent activity based on a calendar entry or any other task entry in electronic format accessible by the device 200 via the network 175.

Referring to FIG. 3, in one or more examples, the method is implemented by the supervisor device 130. The supervisor device 130 receives a notification that the user is initiating an activity, as shown at 305. For example, the user may start the washing machine 118, or the user may start a teleconference meeting on the computer 120, or any other such activity on using one or more of the IoT device in the system 100. The one or more IoT device from the system 100 on which the user initiates the activity sends the indication to the supervisor device 130. Alternatively, or in addition, the supervisor device 130 receives a notification from a calendar entry associated with the user that the user is about to initiate the teleconference meeting. For example, the calendar may be an electronic calendar such as LOTUS NOTES™, OUTLOOK™, GOOGLE CALENDAR™, or the like, which is accessible via the network 175. Accordingly, the calendar (or meeting application) sends the notification to the supervisor device 130.

In one or more examples, the notification may be sent in text format (for example, raw input). In one or more examples, the notification may be sent directly to the device (other than supervisor device 130), which in response to receiving the notification, mutes noise emanation based on cognitive intelligence to understand the text. In one or more examples, such a notification with the text is communicated or broadcast to all the devices in the system 100 using a messaging application or protocol. For example, the raw input in the notification may be "Kids study hour from 4:00 to 5:00 PM" or "Meditation at 7:00 AM", or the like, the devices receiving the notification analyze the text, by syntactically and semantically parsing the text and time in the notification, and go in mute/silent mode at the specified time in response. Thus, the devices powered by cognitive intelligence analyze the raw inputs from the user and reduce noise accordingly. Alternatively, or in addition, the supervisor device 130 receives the notification from the user and analyzes the raw input using the cognitive intelligence, and in response sends the mute command to the devices as described herein.

The supervisor device 130 determines whether the activity initiated is a silent activity, as shown at 310. For example, the supervisor device 130 may have a predetermined list of activities that are categorized as the silent activities. Accordingly, if the currently initiated activity is one of those on the predetermined list, the supervisor device 130 determines that the currently initiated activity is a silent activity, else that it is not a silent activity. If the currently initiated activity is not a silent activity, the supervisor device 130 continues to operate, as shown at 310.

Alternatively, if the currently initiated activity is categorized as a silent activity, the supervisor device 130 instructs at least a subset of the IoT devices in the system 100 to reduce noise emanation, as shown at 320. In one or more examples, the supervisor device 130 identifies a subset of the IoT devices in the system 100, as shown at 322.

In one or more examples, the supervisor device 130 selects the IoT device from the system 100 that are in a predetermined vicinity from the device that the user is using for the activity. The predetermined vicinity may represent a distance, such as 5 meters, 10 meters, 30 meters, or any other distance, which may be configurable. For example, the supervisor device 130 may include a map, such as in the memory 210, that identifies a location of each IoT device 200 in the system 100. Alternatively, or in addition, the supervisor device 130 queries each IoT device 200 in the system 100 for its location. The supervisor device 130 further determines whether the IoT device 200 is with the predetermined vicinity of the activity based on a distance between the IoT device 200 and the activity.

Alternatively or in addition, in one or more examples, the supervisor device 130 selects the IoT devices that emanate at least a predetermined amount of noise as part of the set. For example, the supervisor device 130 may include a predetermined list of the IoT devices from the system 100 and corresponding noise levels. Further, the supervisor device 130 may identify the IoT devices that have corresponding noise levels above a predetermined threshold, which may be configurable.

Figure 4:
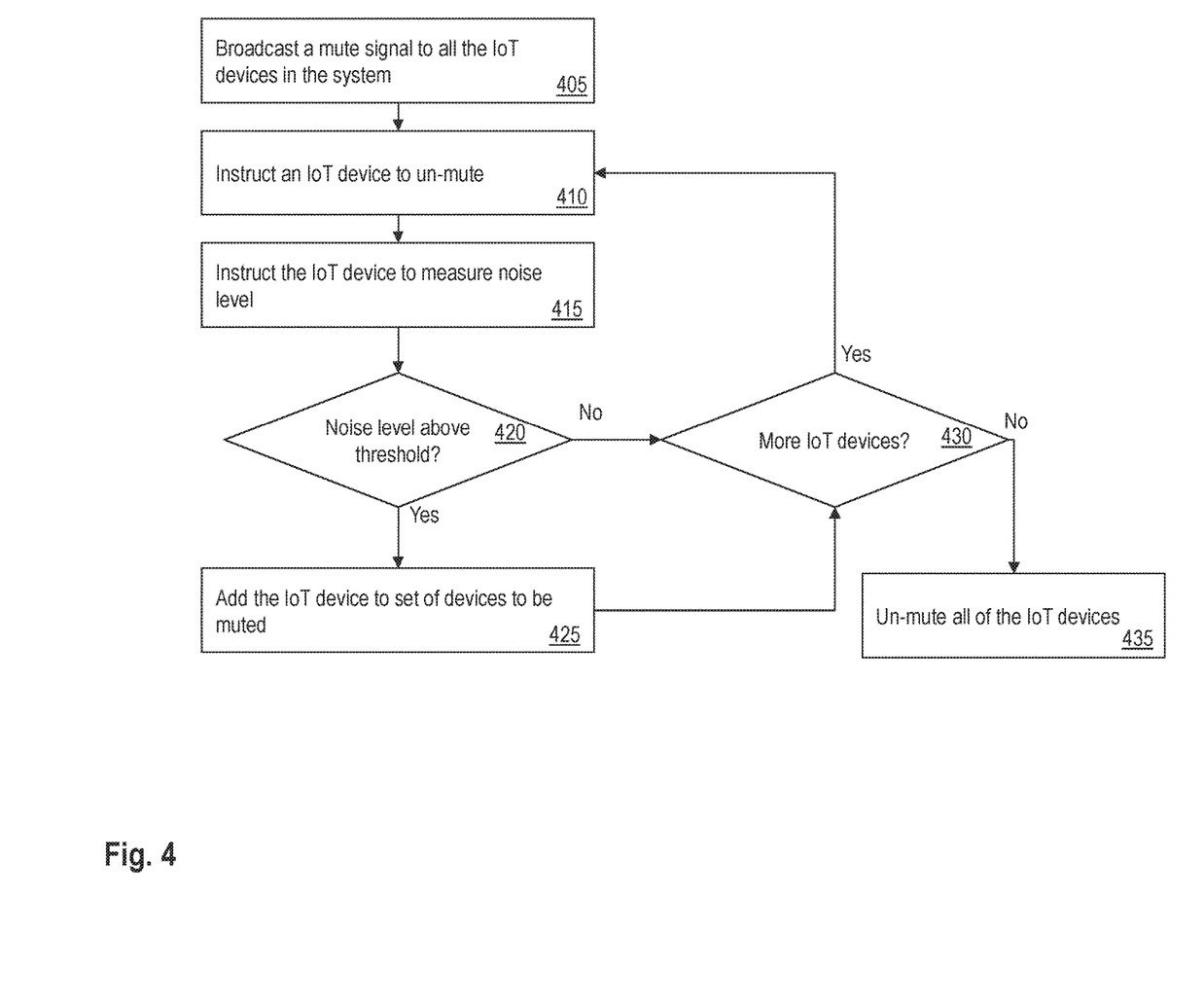
FIG. 4 illustrates a flowchart of an example that facilitates reducing noise emanated by IoT devices in a wireless system in accordance with one or more embodiments.

In one or more examples, the supervisor device 130 checks the noise being emanated by each IoT device 200 from the system 100. For example, as shown in FIG. 4, the supervisor device 130 instructs each IoT device 200 to mute, as shown at 405. For example, the supervisor device 130 broadcasts a mute signal to all of the IoT devices in the system 100. In one or more examples, the mute signal pauses the operation of the IoT devices from the system 100. Alternatively, the supervisor device 130 sends a separate mute signal to each of the IoT devices, based on respective type. For example, if the IoT device 200 is a TV, or any other such media playback device, the mute signal from the supervisor device 130, is a mute command that mutes the audio playback of the device 200. Alternatively, if the IoT device 200 is a washing machine, the supervisor device 130 sends, as the mute signal, an instruction to pause the operation of the washing machine. Thus, the mute signal sent to each of IoT device depends on the type of the IoT device.

In one or more examples, a washing machine may have multiple phases or modes for washing clothes, such as a wash phase, a spin phase, a rinse phase, a drying phase, and the like. One or more of such phases may emanate more noise than a predetermined threshold. For example, consider that the spin phase is an activity that generates noise above the predetermined threshold, and that the other phases emanate noise in acceptable levels (below the predetermined threshold). In such a case, if the washing machine is not in the spinning phase, for example has completed the spinning phase, and receives a mute command, or a notification that causes the mute command, the washing machine does not halt its operations because the current (and subsequent) activities do not emanate noise above the predetermined threshold. However, if the command is received while the washing machine is in or about to start the spinning phase, then the washing machine halts the operation until in receives an unmute command or a corresponding notification. It is understood that the above phases are used just as one example, and that other examples may involve different and/or additional or fewer phases. Further, the washing machine is also used as one example, and that any other device from the system 100 may implement the mute command as described in the example scenario above. As described herein, the mute for a device does not just indicate a silent operation, and varies from one device to another device.

The supervisor device 130 subsequently checks the noise emanated by each of the IoT device 200. For example, the supervisor device 130 sends an un-mute signal to each of the IoT devices, as shown at 410. The un-mute signal is the opposite of the mute signal sent earlier. Thus, depending on the type of the IoT device 200, the mute signal may be an instruction to resume operation (such as in case of the washing machine) or to resume audio playback (such as in case of the TV or music system).

The supervisor device subsequently instructs the IoT device 200, which was un-muted, to measure a noise level and report the sound level back, as shown at 415. The IoT device 200 measures the noise level using a noise sensor. Upon receiving the noise level from the IoT device, the supervisor device 130 checks if the noise level is above the predetermined threshold noise level, as shown at 410 and 420. If the noise level crosses the predetermined threshold, the supervisor device 130 selects the IoT device 200 as part of the set of IoT devices to be muted, else the IoT device 200 is not selected as part of the set of IoT devices to be muted, as shown at 425. The supervisor device 200 ensures that each IoT device 200 is checked in this manner, as shown at 430. Once all of the IoT device in the system 100 are checked in this manner, the supervisor device un-mutes all of the IoT devices from the system 100, as shown at 435. The supervisor device 130 thus determines the set of devices that emanate noise level above the predetermined threshold. In one or more examples, the supervisor device 130 may determine the set prior to the initiation of the activity. Alternatively, or in addition, the supervisor device 130 determines the set in this manner after receiving the activity initiation indication.

In one or more examples, the supervisor device 130 selects all the IoT devices in the system 100 as the devices to be muted.

Referring back to FIG. 3, the supervisor device 130, in response to the currently initiated activity being a silent activity, sends a mute signal to each of the IoT device 200 in the set of IoT devices to be muted, as shown at 324. As described earlier, the mute signal to each of the IoT device 200 may be different depending on the type of the IoT device.

Once the activity is complete, the supervisor device 130 may receive a notification indicating completion, as shown at 330. For example, if one of the IoT devices from the system 100 is performing the activity, the device sends the indication to the supervisor device 130. Alternatively, if the activity does not use one of the devices from the system 100, the supervisor device 130 may determine completion of the activity based on the calendar entry associated with the activity, such as a meeting duration. Once the activity is completed, the supervisor device 130 un-mutes the IoT devices that were muted, as shown at 340.

In one or more examples, one or more of the IoT devices from the system 100, other than the supervisor device 130, may implement the method described herein. For example, the device 200 that is being used by the current activity that is initiated performs the method described herein. In one or more examples, the user prior to initiating the silent activity, or upon starting the silent activity, initiates the reduction of the noise level via the device 200 being used for the silent activity. For example, the user may interact with a user-interface provided by the device 200 that facilitates the user to reduce the noise of all of the IoT devices from the system 100 via a single user-interface interaction, such as a button-click or the like.

Accordingly, the technical solutions described herein facilitate reducing noise level in a surrounding, such as a home, an office, or the like in response to a specific activity being initiated. While, typically a mute option only works for devices which generate playback sounds, such as a mobile phone, an audio system, or a TV, the technical solutions described herein facilitate reducing noise from all IoT-enabled devices such as a washing machines, an oven, an air-conditioner, and the like, which generate noise in the form of mechanical noise during their operation, such as due to vibrations of their components. Such mechanical noises can disturb/distract user during the silent activity that the user is about to embark upon. The technical solutions herein facilitate, devices, such as at home to seamlessly switch into mute/silent mode and back to avoid disturbance to the user during such silent activity.

Thus, in other words, typically, a 'mute operation' is a standard feature available in devices that play music or other forms of audio, such as a radio, a TV, a mobile phone, and the like. The mute operation typically puts the device in silent mode to avoid disturbance to a user or other people nearby during an activity that may be noise sensitive. Such a noise sensitive activity, referred to as a silent activity, may include a conversation, a meeting, a phone call, practicing music, listening to music, watching TV, or other such activities. In other words, a silent activity may be defined as an activity during which the user would prefer to have other devices create as little noise as possible. While, the mute operation facilitates stopping the audio emanating from the audio-playback devices as described above, other devices that emanate mechanical noise, such as washing machines, ovens, air conditioners, do not have such a mute operation. Further, even if the devices above include the mute operation, individually muting each and every such device can be tedious.

Thus, the technical solutions described herein facilitate reducing noise emanation from all the devices in the surrounding at ones using a broadcast mute operation that sends a mute operation to all of the audio playback devices and further pauses operation of the devices that do not even support a mute operation, by pausing their mechanical operations. Further, in one or more examples, the surrounding devices, such as devices at home, are automatically switched into such a mute/silent mode when the user is going to start a silent activity.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments described herein.

What is claimed is:

1. A computer implemented method for reducing noise emanated by a device, the method comprising:
   receiving, by a supervisor device of a wireless system, a notification that an activity is being initiated, wherein the notification is received from a calendar entry of the activity in electronic format;
   in response to receiving the notification, determining, by the supervisor device, whether the activity is associated with noise reduction by the device by comparing the activity to a list and in response to determining that the activity is associated with noise reduction by the device, reducing the noise emanated by the device by:
- determining, by the supervisor device a location of the device;
- determining, by the supervisor device, that the device has a corresponding noise level greater than a threshold amount based upon a list stored on the supervisor device; and in response to the location of the device being is within a predetermined vicinity of a location of the activity, sending, by the supervisor device a mute signal to the device,
- wherein the device and calendar are operable communication with the supervisor device through a communication network.

2. The computer implemented method of claim 1, wherein the mute signal instructs the device to mute a mechanical noise being generated by the device.

3. The computer implemented method of claim 1, wherein the mute signal instructs the device to mute an audio playback by the device.

4. The computer implemented method of claim 1, wherein the supervisor device is further configured to determine that the activity is a silent activity, and to reduce the noise emanated by the second device in response.

5. The computer implemented method of claim 1, wherein the supervisor device sends the mute signal to multiple devices in the wireless system.

6. The computer implemented method of claim 1, wherein the device is a first device, and wherein the activity is initiated on a second device that is in the wireless system.

7. The computer implemented method of claim 6, wherein the second device sends the notification to the supervisor device.

8. The computer implemented method of claim 1, wherein the supervisor device communicates with the device in wired manner.

9. The computer implemented method of claim 1, wherein the supervisor device communicates with the device in a wireless manner.

10. A system for reducing surrounding noise, the system comprising:
- a supervisor device of a local area network, the supervisor device being configured to receive a notification indicative of initiation of an activity by a first device in a local area network, wherein the notification is received from a calendar entry of the activity in electronic format;
- in response to receiving the notification, determining, by the supervisor device, whether the activity is associated with noise reduction by the device by comparing the activity to a list;
- the supervisor device further configured to reduce noise emanated by a second device in the local area network in response to determining that the activity is associated with noise reduction by the device, by:
  - determining a location of the device;
  - determining, by the supervisor device, that the device has a corresponding noise level greater than a threshold amount based upon a list stored on the supervisor device; and
  - in response to the location of the device being is within a predetermined vicinity of a location of the activity, sending a mute signal to the device,
    - wherein the device and calendar are operable communication with the supervisor device through a communication network.

11. The system of claim 10, wherein the mute signal instructs the second device to mute a mechanical noise being generated by the second device.

12. The system of claim 10, wherein the mute signal instructs the second device to mute an audio playback by the second device.

13. The system of claim 10, wherein the supervisor device is further configured to determine that the activity is a silent activity, and to reduce the noise emanated by the second device in response.

14. The system of claim 10, wherein the second device is a plurality of devices in the local area network, wherein the supervisor device sends the mute signal to the plurality of devices.

15. The system of claim 10, wherein the second device sends the notification to the supervisor device in response to the activity being initiated by the second device.

16. A computer program product for reducing surrounding noise emanated by one or more devices connected via a local area network (LAN), the computer program product comprising a computer readable storage medium, the computer readable storage medium comprising computer executable instructions, wherein the computer readable storage medium comprises instructions to perform a method comprising:
- receiving, by a supervisor device of the LAN, a notification that an activity is being initiated, wherein the notification is received from a calendar entry of the activity in electronic format;
- in response to receiving the notification, determining, by the supervisor device, whether the activity is associated with noise reduction by the device by comparing the activity to a list and
- in response to determining that the activity is associated with noise reduction by the device, reducing, by the supervisor device, the noise emanated by the device by:
  - determining, by the supervisor device a location of the device;
  - determining, by the supervisor device, that the device has a corresponding noise level greater than a threshold amount based upon a list stored on the supervisor device; and
  - in response to the location of the device being is within a predetermined vicinity of a location of the activity, sending, by the supervisor device a mute signal to the device,
    - wherein the device and calendar are operable communication with the supervisor device through a communication network.

17. The computer program product of claim 16, wherein the mute signal instructs the device to mute a mechanical noise being generated by the device.

18. The computer program product of claim 16, wherein the mute signal instructs the device to mute an audio playback by the device.

19. The computer program product of claim 16, wherein the method further comprises, determining, by the supervisor device that the activity is a silent activity, and reducing the noise emanated by the device in response.

20. The computer program product of claim 16, wherein the supervisor device sends the mute signal to multiple devices in the LAN.

* * * * *